(12) United States Patent
Crapo et al.

(10) Patent No.: US 6,442,569 B1
(45) Date of Patent: Aug. 27, 2002

(54) APPARATUS AND METHOD FOR DATA TRANSFER BETWEEN DATABASES

(75) Inventors: Andrew Walter Crapo, Scotia; Richard Christopher Noel, Piscataway; James Leigh Douglass, Saratoga Springs, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/299,282

(22) Filed: Apr. 26, 1999

(51) Int. Cl.[7] .............................................. G06F 17/30
(52) U.S. Cl. ............................ 707/201; 707/102; 707/6
(58) Field of Search ........................... 707/9, 101, 201, 707/102, 6, 210, 202, 203, 204; 709/248; 714/19, 20; 7/21

(56) References Cited

U.S. PATENT DOCUMENTS

| | | | |
|---|---|---|---|
| 5,895,467 A | * 4/1999 | Ubell et al. | 707/9 |
| 6,014,670 A | * 1/2000 | Zamanian et al. | 707/101 |
| 6,029,178 A | * 2/2000 | Martin et al. | 707/201 |
| 6,167,405 A | * 12/2000 | Rosensteel, Jr. et al. | 707/12 |

* cited by examiner

*Primary Examiner*—Kim Vu
*Assistant Examiner*—Tam V Nguyen
(74) *Attorney, Agent, or Firm*—David C. Goldman; Jill M. Breedlove

(57) ABSTRACT

The present invention provides a method for transferring data between source and target databases in a computer system that can adapt to changes in the schema of the source database and/or target database. This adaptability is achieved by determining the intersection of the source and target database schemas prior to a transfer of data between the databases. Since the intersection is determined prior to a transfer, changes in the schema of the source and/or target database are automatically accommodated. In one embodiment, the method includes the ability to specify the desired frequency with which data is to be transferred between source and target databases. The method, which is implemented as a computer program, is also capable of operating in a computer system in which other tasks are competing for processor time. In this embodiment, the method automatically adjusts the priority of the task of transferring data between source and target databases relative to other tasks that are competing for processor time. This adjustment is based upon information relating to the desired frequency for transferring data between source and target databases.

13 Claims, 2 Drawing Sheets

UpdateClient

TargetDataBase

Force
    LagLimit  (Default)
    MaxPriority    (Default)
    MinPriority    (Default)

Tables
        \<Table 1\>
            Interval
            LagLimit
            LastTime
            MaxPriority
            MinPriority
            TargetTable
        \<Table2\>
            *
            *
            *

\<Table n\>

UpdateClient

TargetDataBase

Force
    LagLimit (Default)
    MaxPriority (Default)
    MinPriority (Default)

Tables
        <Table 1>
            Interval
            LagLimit
            LastTime
            MaxPriority
            MinPriority
            TargetTable
        <Table2>
            *
            *
            *

<Table n>

FIG. 3

APPARATUS AND METHOD FOR DATA TRANSFER BETWEEN DATABASES

BACKGROUND OF THE INVENTION

The present invention relates to databases and, more particularly, to the transfer of data between databases.

Databases are structures that are used within computer systems to organize data, generally large amounts of data. For instance, one type of database organizes data into records with each record containing a number of fields. Consequently, this type of database can be conceptualized as a series of rows that are each divided into a series of columns. The rows represent the records in the database, and the columns represent the fields. For example, a credit card company could have such a database that is comprised of records that represent all of its accounts. Each record could include a field for the account number, the name of the account holder, the address of the account holder, the current account balance etc.

In many situations it is desirable to transfer data from one database to another database. The database from which the data is transferred is typically referred to as the source database, and the database to which the data is transferred is typically referred to as the target database. Continuing with the credit card company example, there might be a source database that accumulates records of all of the credit card transactions in a twenty-four hour period. The target database, in contrast, could accumulate all of the transactions for each credit card account within a billing period.

It is common place for the definition of how a source or target database is organized to change, typically as part of an upgrade to the system within which the database is used. The definition of how a database is organized is typically referred to as the schema of the database. To continue with the credit card company example, the target database could originally include all of an account holder's transactions for a billing period. If the credit card company were to start offering mortgage services to its credit card holders and want to provide the account holders with a consolidated bill that included credit card charges and a mortgage invoice, the target database could be modified to accommodate this possibility. Presently, such a modification requires that the software program that transfers the data be modified to reflect the change to the source or target database.

BRIEF SUMMARY OF THE INVENTION

It is therefore desirable to provide a method for transferring data between source and target databases in a computer system that accommodates changes in the schema of the source and/or target databases. The method is implemented in the form of a computer program that operates to determine the elements of the source database schema, the elements of the target database schema, and the elements that are common to the source and target database schemas, i.e., the intersection of the database schemas. Once the intersection of the source and target database schemas has been determined, the program facilitates the transfer of data in the common elements from the source database to the target database.

The present invention, by determining which elements are common to the source and target databases, provides a number of advantages relative to known methods of transferring data between databases. Namely, because the present invention determines which data is to be transferred, the need to maintain configuration information with details about the data to be transferred between the databases is substantially eliminated. Further, by not having to maintain configuration information on which data is to be transferred, the possibility of having inconsistencies between the configuration information and the schemas of the databases is likewise reduced. Relatedly, the cost of having to maintain the schemas and the configuration information is largely eliminated. A further consequence of determining which data is to be transferred, rather than maintaining this information, is that the program which causes the data to be transferred between the databases does not have to be modified to accommodate most changes in one or both of the schemas of the source and target databases.

BRIEF DESCRIPTION OF THE DRAWINGS

FIG. 3 illustrates the format of a key that is used to transfer data between a source database and a target database according to the method of the present invention.

DETAILED DESCRIPTION OF THE INVENTION

Figure 1:
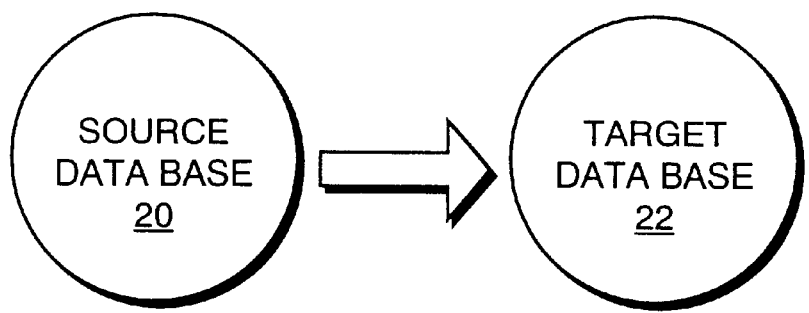
FIG. 1 symbolically illustrates the source database and the target database that receives some or all of the data in source database according to the method of the present invention.
Figure 2:
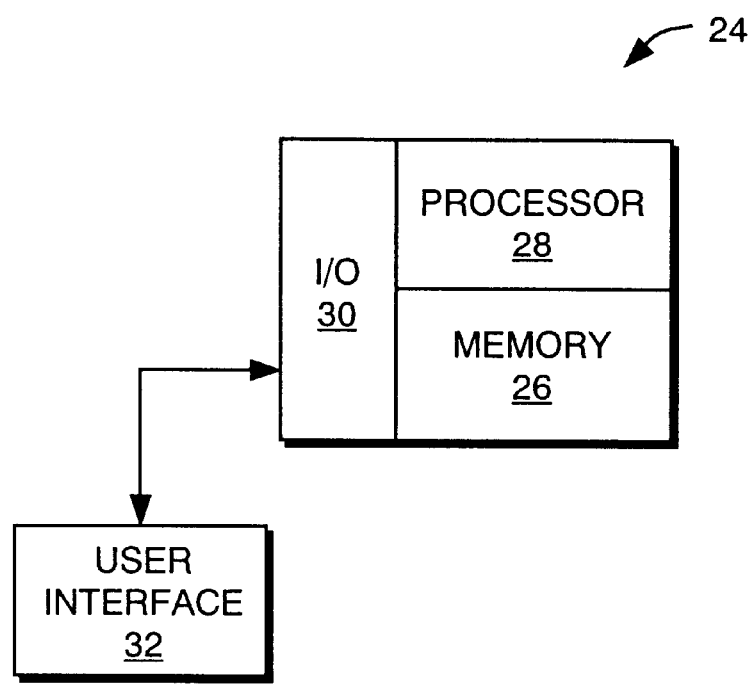
FIG. 2 is a block diagram of a general computer system within which a program embodying the method of the present invention can be executed.

With reference to FIGS. 1 and 2, the present invention provides a method for transferring data between a source database 20 and a target database 22. The method is implemented in the form of a computer program that is resident in a computer system 24. Generally, the computer system 24 is comprised of a memory 26 that stores the program, a processor 28 for executing the program stored in the memory 26, and an input/output port 30 for receiving and sending information. The source database 20 is either resident in the memory 26 or the memory of a separate computer system. If the source database is resident in the memory 26, the input/output port 30 is used to receive the data that populates the source database 20. If the source database 20 is resident in a separate computer system, the input/output port 30 is used to conduct the communications needed to receive data that is in the source database 20 of the other computer system. These communications can occur over any number of communication networks, including local area networks, wide area networks, the Internet, satellite and other wireless communication systems, land line systems and combinations thereof. The target database 22 is also resident in either the memory 26 or the memory of a separate computer system. If the target database 22 is resident in a separate computer system, the input/output port 30 is used to conduct the communications needed to transmit data to the target database 22 in the other computer system. These communications can also occur over any type of communication network or combination of communication networks.

The computer system 24 also includes a user interface 32 that allows a user to interact with the program during execution. Typically, the user interface 32 includes an output peripheral that allows the program to provide information to the user and an input peripheral that allows the user to provide information to the program. In one embodiment, the input peripheral is a keyboard, and the output peripheral is a monitor. Other types of input peripherals can also be employed. Among the many other types of input peripherals that can be used are a mouse and a voice recognition system. Similarly, other types of output peripherals can be employed, including printers.

The source database 20 and target database 22 can be either the same type or different types of databases. Two different types of databases that are in wide spread use are relational databases and objected oriented databases. With respect to these two types of databases, the source database 20 and target database 22 operated upon by the invention can: (1) both be relational databases; (2) both be object oriented databases; or (3) one can be a relational database and the other can be an object oriented database. A relational database is typically conceptualized as a table comprised of one or more rows with each row divided into a number of fields. Object oriented databases, in contrast, are comprised of objects that each have attributes. The invention is capable of being used with other types of databases.

The program for transferring data between the source database 20 and target database 22 includes a data structure, known as a key, that is used to configure the program. Generally, the key is used to identify features of the source and target databases that are used in accomplishing the data transfer. Within the key are sub-keys that are used to organize the information that is used in performing the transfer. FIG. 3 is an example of the key and sub-key structure. In this example, the identity of the source database has been previously provided to the program and is not part of the key structure. It is, however, feasible that the identity of the source database could be part of the key structure. In FIG. 3, the key is identified as UpdateClient, the sub-key for the target databases is identified as TargetDataBase, and the sub-key for the portions of the source database from which data is to be transferred is identified as Tables. Within the Tables sub-key are the identities of all of the source database tables from which data is to be transferred. It is assumed that the identities of the tables within the target database that are to receive the data are the same as the tables in the source database. For instance, if the name of the table in the source database from which data is to be transferred is "CALTable23," the name of the table within the target database that is to receive some or all of the data from the "CALTable23" table is assumed to be named "CAL-Table23." It is, however, possible to specify an alias. For instance, the table in the target database that is to receive data from the "CALTable23" table of the source database could be named "MAXIM." The name "MAXIM" would, however, be identified as an alias for "CALTable23." The alias is specified in the sub-key for a table of the source database identified as TargetTable.

In operation, the program queries the source database to determine the identity of the elements comprising the schema or format of the source database and forms a list of these elements. For example, if the source database is a relational database, the query would identify the fields. In the case of a object orient database, the query would identify the attributes. Similarly, the program also queries the target database and forms a list of these elements. Once both of the lists for a source and target database pair have been obtained, the lists are compared to determine the intersection or overlap of the two lists. For example, the source database may have the fields "Name" and "Social Security Number," and the target database may have the attributes of "Name," "Address" and "Social Security Number." In this case, the intersection of the source and target databases is "Name" and "Social Security Number." Typically, to overlap, there must be a match in both the identity of the element and data type. To continue with the example, in the source database, "Name" would be a text data type of field and "Social Security Number" would be a numeric data type of field. For there to be an overlap, the "Name" and "Social Security Number" attributes of the target database would respectively have to be of a text data type and a numeric data type. Once the intersection for a source and target database pair has been determined, the program operates to transfer data that is in the overlapping elements from the source database to the target database.

Subsequently, if the schema or format of a source or target database changes, the program is restarted. Restarting the program causes the query and overlap determination process to be repeated. Consequently, the program automatically adapts to these types of changes. Alternatively, instead of restarting the program after a change, the program issues queries to the source and target databases and determines the intersection prior to each transfer of data between the source and target databases. In the case of additions or deletions of source and target data pairs, the appropriate changes are made to the relevant key structures and the program is restarted, which causes the query and overlap determination process to be repeated. Alternatively, instead of restarting the program after a change, the program reads the relevant key structure prior to each transfer of the data between the source and target databases.

The program also facilitates the periodic transfer of data from the source database to the corresponding target database. With reference to FIG. 3, the desired period between transfer is defined by an update interval (Interval) that can be specified by the user for each table of the source database.

It is further anticipated that the program will not be the only program executing on the computer system 24. Consequently, the program is also able to prioritize the task of transferring data between the source and target databases relative to other tasks vying for processor time. Because other tasks may be executing on the computer system 24, the program is also able to tolerate some lag in the transferring of data between the source and target databases. However, the program also operates to increase the priority of the task of transferring data between source and target databases if the lag is approaching or exceeding a predetermined threshold. To achieve this functionality, an update lag parameter (LagLimit) is provided that specifies the lag that will be tolerated in transferring data to the target database relative to the specified update interval. With reference to FIG. 3, the user can specify a LagLimit for each of the identified tables in the source database. If the user does not specify a LagLimit, a default LagLimit that is also set forth in the key is used. A minimum priority parameter (MinPriority) and a maximum priority parameter (MaxPriority) are also provided. The MinPriority parameter defines the priority that is assigned to the data transferring task when the transfers are occurring between the source and target databases within the specified Interval value. The maximum priority parameter defines the maximum priority that can be assigned to the task of transferring data between the source and target databases when the transfer has not occurred within the specified Interval and, more specifically, when the transfer has not within the specified LagLimit. With reference to FIG. 3, the user can specify a MinPriority and MaxPriority for each of the identified tables in the source database. If the user does not specify a MinPriority or MaxPriority, default values that are also set forth in the key are used. Also associated with each source database is a time of last update parameter (LastTime) that indicates the time at which data was most recently transferred from the source database to the target database.

Essentially, the task of prioritizing the transferring of data from a source database to a target database involves determining whether a transfer, if it were to occur immediately, would be within the specified value of the Interval parameter. This is done by adding the value of the LastTime parameter to the value of the Interval parameter and subtracting the current time from the sum. The resulting value is known as the slack. If the slack is greater than zero, this indicates that it is still possible for the transfer of data from the source database to the target database to occur within the specified value of the Interval parameter. As such, the priority of the task of transferring data from the source database to the target database is set to the value of the MinPriority parameter. If, however, the slack is zero or less than zero, this means that the transfer of data from the source database to the target database has not occurred within the specified value of the Interval parameter. In this case, the priority of the task is increased. The extent to which the priority of the task is increased depends upon how late the transfer would be if it were to occur immediately. To elaborate, if the absolute value of the slack (which is zero or less than zero) is greater than the value of the LagTime parameter, then the failure to transfer data from the source database to the target database has exceeded the maximum tolerance. In this case the priority of the task is set to MaxPriority. If the absolute value of the slack is between zero and the value of the LagLimit parameter, then priority is calculated as a linear interpolation of priority between the values of MinPriority and MaxPriority base upon the where the value of the slack falls between zero and the value of the LagLimit parameter.

The program is further able to establish a time at which it will begin to reevaluate the priorities associated with the tasks of transferring data from tables associated with the source database to a target database. Namely, at the completion of the evaluation of the priority to be established for the transfer of data between the tables of the source database to the target database, the minimum value of all of the values for the Interval parameters associated with each of the source database tables is determined. The minimum value of all of the values of the slack parameter associated with each of the source database tables is also determined. If the lesser of the minimum Interval value and the minimum slack value is greater than zero, the lesser value is added to the current time to establish the time at which the reevaluation will commence.

Also associated with the key structure is a Force parameter that permits the user to cause a transfer of data from the source database to the target data even of data that has already been transferred. This is useful if, for example, data that has been transferred to the source database has been corrupted. In this situation, the Force parameter permits the data to be retransferred from the source database.

The foregoing description of the invention has been presented for purposed of illustration and description. Further, the description is not intended to limit the invention to the form disclosed herein. Consequently, variations and modifications commensurate with the above teachings and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A method for transferring data between a first database and a second database comprising:

providing a first database having a first schema with a first plurality of elements;

providing a second database having a second schema with a second plurality of elements;

determining the intersection elements of said first plurality of elements and said second plurality of elements which are the elements of said second plurality of elements that are common to said first plurality of elements;

transferring data that is in said intersection elements of said first database to said second database;

repeating said step of transferring;

establishing an update interval that defines a desired period of time between consecutive steps of transferring:

monitoring the time elapsed since the last stop of transferring occurred; and increasing the priority of repeating said step of transferring relative to other tasks as the elapsed time since the last step of transferring occurred approaches said update interval.

2. The method as claimed in claim 1, wherein said step of determining comprises:

issuing a first query to said first database to provide said first schema; and issuing a second query to said second database to provide said second schema.

3. The method as claimed in claim 1, wherein:

said first plurality of elements includes one of the following: fields and attributes.

4. The method as claimed in claim 1, wherein:

said second plurality of elements includes one of the following: fields and attributes.

5. The method as claimed in claim 1, wherein:

said step of determining includes comparing the name and data type of each of said first plurality of elements to the name and data type of each of said second plurality of elements.

6. The method as claimed in claim 1, wherein:

said step of determining includes considering whether one of said first plurality of elements corresponds to one of said second plurality of elements even though the name of said one of said first plurality of elements is not the same as the name of said one of said second plurality of elements.

7. The method as claimed in claim 1, wherein said step of repeating includes:

increasing the priority of repeating said step of transferring relative to other tasks when the elapsed time since the last step of transferring occurred equals said update interval.

8. The method as claimed in claim 1, wherein said step of repeating includes:

increasing the priority of repeating said step of transferring relative to other tasks as the elapsed time since the last step of transferring exceeds said update interval.

9. The method as claimed in claim 6, wherein said step of repeating includes:

increasing the priority of repeating said step of transferring relative to other tasks to a maximum priority as the elapsed time since the last step of transferring exceeds said update interval by a lag interval.

10. An apparatus for transferring data between a source and target databases comprising:

source query means for issuing a query to a first source database having a first source database schema with a first plurality of source database elements to determine said first source database schema;

target query means for issuing a query to a first target database having a first target database schema with a first plurality of target database elements to determine said first target database schema;

means for determining first common elements that are common to said first source database elements and said first target database elements; and means for transferring data that are in said first common elements from said first source database to said first target database, said means for transferring includes means for specifying a first update interval for repeatedly transferring data that are in said first common elements; means for specifying a second update interval for repeatedly transferring data that are in said second common elements; means for monitoring the first elapsed time since the last transfer of data that are in said first common elements; means for monitoring the second elapsed time since the last transfer of data that are in second common elements; and means for using information relating to said first elapsed time and said second elapsed time to control the priority of transferring data from said first. common elements of said first source database and from said second common elements of said second source database.

11. The apparatus as claimed in claim 10, wherein:

said source query means includes means for issuing a query to a second source database having a second source database schema with a second plurality of source database elements to determine said second source database schema;

said target query means includes means for issuing a query to a second target database having a second target database schema with a second plurality of target database elements to determine said second target database schema;

said means for determining includes means for determining second common elements that are common to said second source database elements and said second target database elements;

said means for transferring includes means for transferring data that are in said second common elements from said second source database to said second target database.

12. The apparatus as claimed in claim 10, wherein:

said first database is of a first type; and said second database is of a second type that is different than said first type.

13. The apparatus as claimed in claim 10, wherein:

said first type is one of the following: a relational database and an object oriented database.

* * * * *